US011506742B2

(12) United States Patent
Murphy et al.

(10) Patent No.: US 11,506,742 B2
(45) Date of Patent: Nov. 22, 2022

(54) AUTONOMOUS DISTRESS TRACKING USING AUTOMATIC DEPENDENT SURVEILLANCE-BROADCAST

(71) Applicant: The Boeing Company, Chicago, IL (US)

(72) Inventors: Timothy A. Murphy, Mukilteo, WA (US); Charles Otis Adler, Mukilteo, WA (US); Jessie Turner, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 915 days.

(21) Appl. No.: 16/362,413

(22) Filed: Mar. 22, 2019

(65) Prior Publication Data
US 2020/0300960 A1    Sep. 24, 2020

(51) Int. Cl.
*G01S 5/00* (2006.01)

(52) U.S. Cl.
CPC ....... *G01S 5/0027* (2013.01); *G01S 2205/003* (2013.01); *G01S 2205/006* (2013.01)

(58) Field of Classification Search
CPC ............ G01S 5/0027; G01S 2205/003; G01S 2205/006; G01S 19/14; G01S 19/17; G01S 19/42; B64D 45/0059; B64D 45/00; G08G 5/0013; G08G 5/0021; G08G 5/0056; H04B 7/18506; B64F 5/60; G08B 5/006
See application file for complete search history.

(56) References Cited

U.S. PATENT DOCUMENTS

| | | | |
|---|---|---|---|
| 10,002,519 B2 | 6/2018 | Bekanich | |
| 2011/0194629 A1* | 8/2011 | Bekanich | H04M 3/5116 375/259 |
| 2016/0176538 A1* | 6/2016 | Bekanich | G08G 5/0021 701/14 |
| 2017/0106997 A1* | 4/2017 | Bekanich | G08B 25/10 |
| 2017/0155763 A1 | 6/2017 | Bekanich | |
| 2018/0240324 A1 | 8/2018 | Bekanich | |
| 2018/0247519 A1 | 8/2018 | Bekanich | |

FOREIGN PATENT DOCUMENTS

| | | |
|---|---|---|
| EP | 3133421 A1 | 2/2017 |
| EP | 3176607 A1 | 6/2017 |
| WO | 2018195214 A1 | 10/2018 |

OTHER PUBLICATIONS

Extended European Search Report dated Sep. 4, 2020, regarding Application No. 20160532.6, 10 pages.
European Office Action dated Mar. 10, 2022, regarding Application No. 20160532.6, 6 pages.

* cited by examiner

*Primary Examiner* — Ankur Jain
(74) *Attorney, Agent, or Firm* — Yee & Associates, P.C.

(57) ABSTRACT

A system and method for autonomous distress tracking of an aircraft. An automatic dependent surveillance-broadcast transceiver is configured to transmit an automatic distress transmission. A system controller comprises a distress identifier that is configured to determine when the aircraft is in a distress condition. The system controller is configured to control the automatic dependent surveillance-broadcast transceiver to transmit the automatic distress transmission in response to a determination that the aircraft is in the distress condition. The automatic dependent surveillance-broadcast transceiver and the system controller are contained within a housing attached to the aircraft on an outside of the aircraft.

20 Claims, 10 Drawing Sheets

AUTONOMOUS DISTRESS TRACKING USING AUTOMATIC DEPENDENT SURVEILLANCE-BROADCAST

BACKGROUND INFORMATION

1. Field

The present disclosure relates generally to tracking the position of an aircraft. More particularly, the present disclosure relates to a method and system for tracking the position of an aircraft that is in distress.

2. Background

Many aircraft carry distress radio beacons. Distress radio beacons also may be known as emergency beacons or by other names. For example, without limitation, many commercial passenger aircraft and other aircraft may carry a distress radio beacon known as an emergency locator transmitter, ELT.

An emergency locator transmitter on an aircraft is intended to aid in locating the aircraft after a crash. An emergency locator transmitter or other distress radio beacon on an aircraft may be manually or automatically activated to send out a distress signal. For example, without limitation, an emergency locator transmitter may be activated automatically upon immersion in water.

The distress signals generated by an emergency locator transmitter or other distress radio beacon on an aircraft may be monitored and detected by a network of satellites worldwide. The geographic position of an emergency locator transmitter or other radio distress beacon emitting a distress signal may be determined using a satellite navigation system, triangulation, or using another method or an appropriate combination of methods.

Current emergency locator transmitters may have several limitations. For example, position information provided by current emergency locator transmitters may not be sufficiently accurate or provided in a sufficiently reliable manner to effectively locate an aircraft in distress effectively. The majority of currently fielded emergency locator transmitters do not provide position information directly. The location of the emergency locator transmitter is determined by radio frequency direction finding or multilateration through satellite links. This process may take an undesirably long time and may not be sufficiently reliable.

The weight of current emergency locator transmitters may be relatively high. Maintenance requirements for current emergency locator transmitters also may be relatively high. For example, most emergency locator transmitters fitted to aircraft today are powered by a non-rechargeable battery that is relatively heavy and must be maintained appropriately to ensure reliable operation and to prevent any undesired condition from occurring. It also may be relatively difficult to reduce or eliminate undesirable tampering with current emergency locator transmitters.

Aircraft crashes that happen in remote areas, including oceanic areas, can present a significant problem to search and rescue personnel as well as accident investigators due to the difficulty of locating the crash site in a timely manner. As an attempt to improve this situation, new aviation requirements of tracking of aircraft in distress have been adopted at the international level. The requirements are performance based and essentially require that the position of an aircraft in distress be automatically broadcast at least once per minute. Furthermore, the system that broadcasts the position reports should be robust to failures in aircraft systems and loss of aircraft power to ensure that the reporting continues for the entire time that an aircraft is in distress.

Accordingly, it would be beneficial to have a method and apparatus that take into account one or more of the issues discussed above, as well as other possible issues.

SUMMARY

The illustrative embodiments of the present disclosure provide an autonomous distress tracking system for an aircraft, comprising an automatic dependent surveillance-broadcast transceiver, a system controller, and a housing. The automatic dependent surveillance-broadcast transceiver is configured to transmit an automatic distress transmission. The system controller comprises a distress identifier that is configured to determine when the aircraft is in a distress condition. The system controller is configured to control the automatic dependent surveillance-broadcast transceiver to transmit the automatic distress transmission in response to a determination that the aircraft is in the distress condition. The housing is attached to the aircraft on an outside of the aircraft. The automatic dependent surveillance-broadcast transceiver and the system controller are contained within the housing.

The illustrative embodiments of the present disclosure also provide an autonomous distress tracking system for an aircraft, comprising a satellite navigation system receiver, a plurality of antennas, a software defined radio, a system controller, and a housing. The satellite navigation system receiver is configured to identify a position of the aircraft using navigation signals received from a satellite navigation system and to provide position information indicating the position of the aircraft. The plurality of antennas comprise a satellite navigation system antenna for receiving the navigation signals for the satellite navigation system receiver, an automatic dependent surveillance-broadcast antenna for an automatic dependent surveillance-broadcast transceiver, an emergency locator transmitter beacon antenna for a beacon transmitter, a satellite communications antenna for a satellite communications transceiver, and a wireless network antenna for connectivity to a wireless network by a wireless network transceiver. The software defined radio is configurable to implement the automatic dependent surveillance-broadcast transceiver, the beacon transmitter, the satellite communications transceiver, and the wireless network transceiver and to transmit a distress transmission via one or more of the automatic dependent surveillance-broadcast antenna, the emergency locator transmitter beacon antenna, the satellite communications antenna, and the wireless network antenna. The system controller comprises a distress identifier configured to determine when the aircraft is in a distress condition and is configured to control the software defined radio to transmit the distress transmission in response to a determination that the aircraft is in the distress condition. The housing is attached to the aircraft on an outside of the aircraft. The satellite navigation system receiver, the software defined radio, and the system controller are contained within the housing.

The illustrative embodiments of the present disclosure also provide a method of autonomous distress tracking of an aircraft. A distress identifier, implemented in a system controller, determines when the aircraft is in a distress condition. An automatic dependent surveillance-broadcast transceiver transmits an automatic distress transmission in response to a determination by the distress identifier that the aircraft is in the distress condition.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
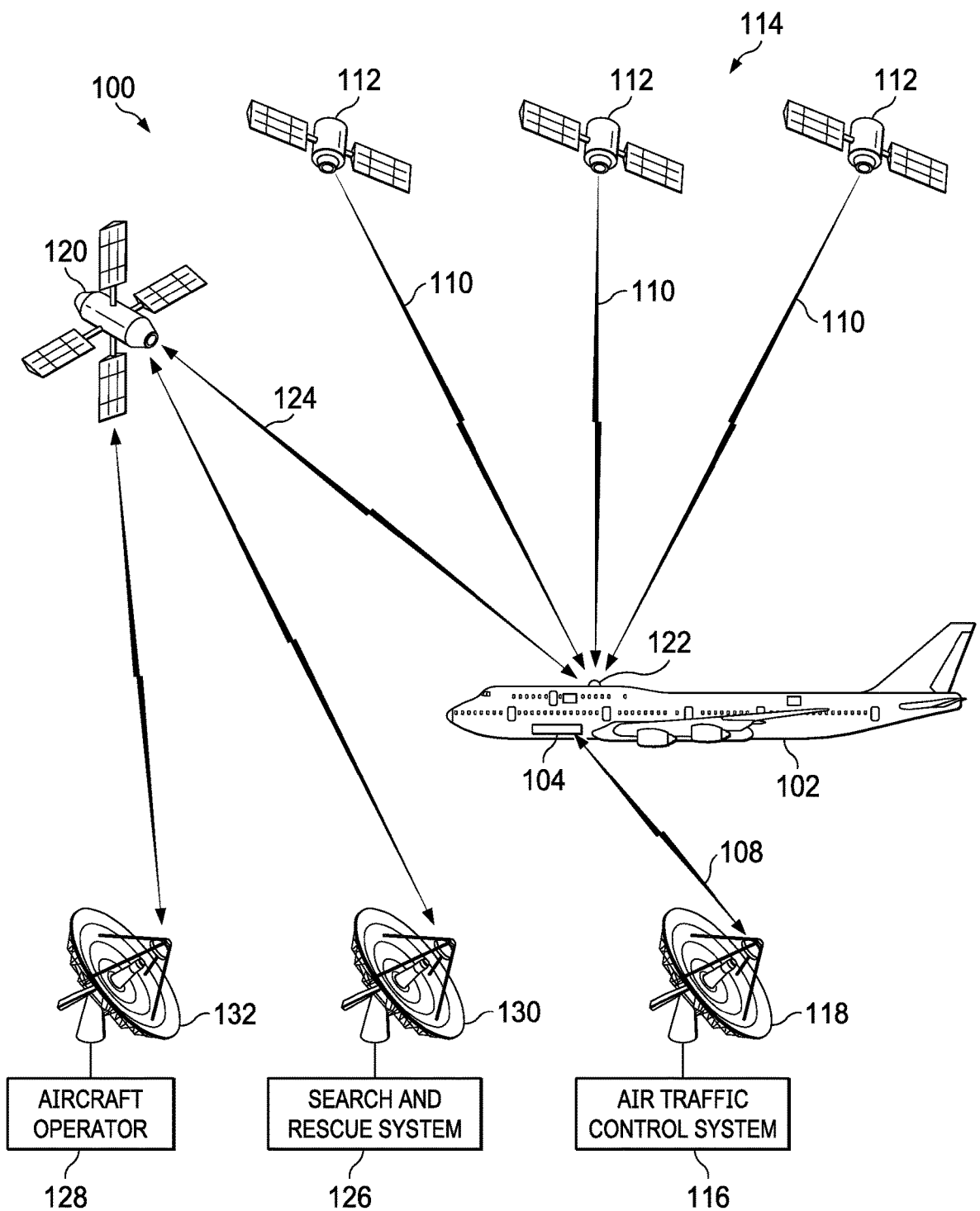
FIG. 1 is an illustration of an aircraft operating environment in accordance with an illustrative embodiment.

The different illustrative embodiments recognize and take into account a number of different considerations. "A number," as used herein with reference to items, means one or more items. For example, "a number of different considerations" are one or more different considerations.

The different illustrative embodiments recognize and take into account that the distress tracking requirement for automatically broadcasting the position of an aircraft in distress may be met with a variety of technologies. Systems that meet these requirements may be generally referred to as autonomous distress tracking, ADT, systems. One such candidate technology for autonomous distress tracking is space-based automatic dependent surveillance-broadcast, ADS-B.

ADS-B technology uses an air traffic control, ATC, transponder on an aircraft to broadcast the position of the aircraft, as derived using a Global Positioning System, GPS, receiver on the aircraft, on a regular basis. ADS-B is now widely deployed technology and ADS-B capability will be required for access to airspace in many parts of the world in the near future. In a space-based ADS-B system, the ADS-B transmissions from an aircraft are received by satellites and relayed to the ground for use by air traffic control systems for surveillance or by other entities with an interest in tracking the position of the aircraft. Multiple organizations are working towards the introduction of space-based ADS-B technology and a full global space-based ADS-B capability.

The different illustrative embodiments recognize and take into account that the use of conventional space-based ADS-B technology for autonomous distress tracking may have undesirable limitations. The typical aircraft transponders used for conventional ADS-B transmissions are relatively high-powered devices, making it difficult to ensure continued operation after loss of aircraft power when an aircraft is in distress. Furthermore, conventional ADS-B systems rely on the GPS receivers on an aircraft to determine the position of the aircraft. Conventional GPS receivers on an aircraft also may be subject to loss of function during a distress condition. Furthermore, conventional transponders used for ADS-B may be controlled by personnel on the aircraft. This makes conventional ADS-B systems inadequate for autonomous distress tracking, because tracking may be affected in an undesired manner from onboard the aircraft.

The illustrative embodiments provide a technical solution that addresses the shortcomings of current distress tracking systems and methods through a novel combination of elements and packaging of those elements. In accordance with illustrative embodiment, autonomous distress tracking of an aircraft is provided using an ADS-B transmitter on the aircraft that is independent of the air traffic control transponders on the aircraft. An ADS-B transmitter for autonomous distress tracking in accordance with an illustrative embodiment is designed to require less power than conventional ADS-B transmission systems and is activated only when the aircraft is in distress. An autonomous distress tracking system in accordance with an illustrative embodiment includes a battery to provide power for the transmissions to continue after loss of aircraft power. The system also includes a GPS receiver to ensure that the GPS determined position of the aircraft is also robust to failures that could be associated with the aircraft distress condition. The system also may include a 121 MHz beacon that may be activated automatically when the aircraft is in distress and which is designed to function after a crash.

An autonomous distress tracking system in accordance with an illustrative embodiment may be provided as a single line-replaceable unit that may be attached to an aircraft on the outside of the aircraft. For example, an autonomous distress tracking system in accordance with an illustrative embodiment may be attached to the outside of an aircraft where an antenna for a conventional emergency locator transmitter might otherwise be attached. In accordance with one illustrative embodiment, an autonomous distress tracking system line-replaceable unit may be fully integrated and self-contained with a battery, ADS-B transmitter, 121 MHz beacon transmitter, and GPS receiver in a housing that looks similar to a conventional blade antenna for an emergency locator transmitter.

Turning to FIG. 1, an illustration of an aircraft operating environment is depicted in accordance with an illustrative embodiment. Aircraft operating environment 100 may include any appropriate environment in which aircraft 102 may be operated in any appropriate manner. For example, without limitation, aircraft 102 may be in flight in aircraft operating environment 100.

Aircraft 102 may be any appropriate type of aircraft that may be configured to perform any appropriate operation or mission in aircraft operating environment 100. For example, without limitation, aircraft 102 may be a commercial passenger aircraft, a cargo aircraft, a military aircraft, or any other appropriate type of aircraft. Further, aircraft 102 may be a fixed wing aircraft, a rotary wing aircraft, or a lighter-than-air aircraft. Still further, aircraft 102 may be a manned aircraft or an unmanned aircraft.

Aircraft 102 may include conventional ADS-B system 104. Conventional ADS-B system 104 may be configured to identify the position of aircraft 102 using navigation signals 110 received from a number of navigation system satellites 112 in satellite navigation system 114 in a known manner. Conventional ADS-B system 104 may be configured to transmit the position of aircraft 102 and other information in conventional ADS-B transmission 108 for use by air traffic control system 116. In this case, conventional ADS-B transmission 108 may be referred to as an ADS-B for air traffic control transmission. Conventional ADS-B transmission 108 may be received by receiving station 118 for air traffic control system 116 either directly or via satellite 120.

In accordance with an illustrative embodiment, aircraft 102 may include autonomous distress tracking system 122. For example, without limitation, autonomous distress tracking system 122 may be attached to the skin of aircraft 102 on the outside of aircraft 102. In accordance with an illustrative embodiment, autonomous distress tracking system 122 may be configured to determine automatically the position of aircraft 102 when aircraft 102 is in flight in aircraft operating environment 100 and to automatically transmit distress transmission 124 including position information identifying the position of aircraft 102 in response to a determination that aircraft 102 is in a distress condition.

Autonomous distress tracking system 122 may be configured to identify the position of aircraft 102 using navigation signals 110 received from a number of navigation system satellites 112 in satellite navigation system 114 in a known manner. Autonomous distress tracking system 122 may use navigation signals 110 received from more than three navigation system satellites 112 in satellite navigation system 114 to determine the position of aircraft 102. For example, without limitation, navigation system satellites 112 may include satellites in satellite navigation system 114 such as the Global Positioning System, GPS, the Global Navigation Satellite System, GLONASS, other appropriate satellite navigation systems, or various combinations of satellite navigation systems that may be used by autonomous distress tracking system 122 to determine the position of aircraft 102.

Distress transmission 124 may include an ADS-B transmission from an ADS-B transceiver in autonomous distress tracking system 122. In addition, distress transmission 124 may include an emergency locator transmitter beacon transmission. Distress transmission 124 is configured to be transmitted to search and rescue system 126 via satellite 120. Distress transmission 124 also may be transmitted to aircraft operator 128 or any another appropriate entity via satellite 120. Aircraft operator 128 may be, for example, without limitation, an airline or any other public or private operator of aircraft 102.

Satellite 120 may comprise any appropriate satellite or plurality of satellites for establishing a communications link between autonomous distress tracking system 122 on aircraft 102 and receiving station 130 for search and rescue system 126 and receiving station 132 for aircraft operator 128 or a third party service provider working on behalf of the aircraft operator, for sending distress transmission 124 to search and rescue system 126 and aircraft operator 128.

Figure 2:
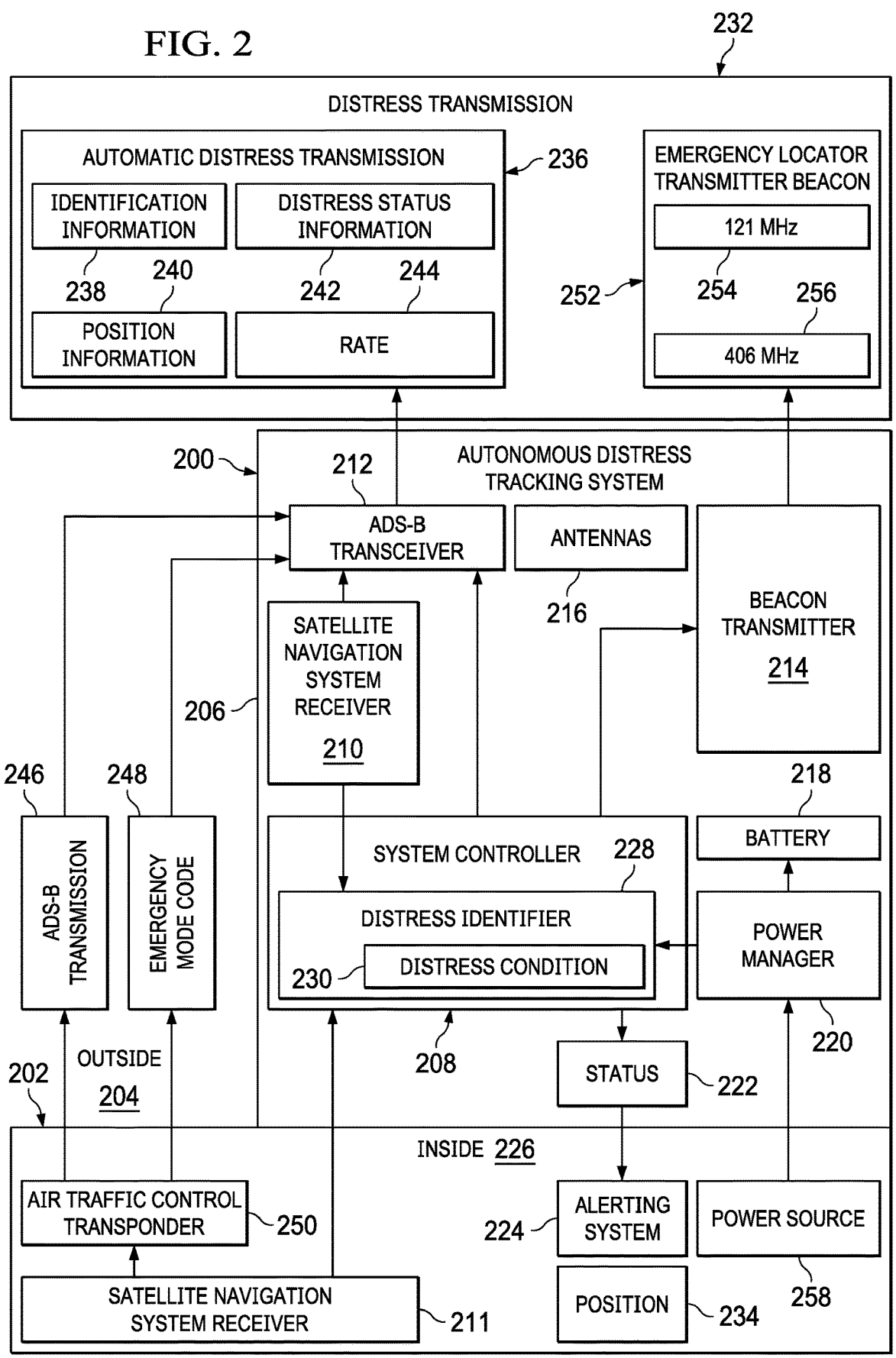
FIG. 2 is an illustration of a block diagram of an autonomous distress tracking system on an aircraft in accordance with an illustrative embodiment.

Turning to FIG. 2, an illustration of a block diagram of an autonomous distress tracking system on an aircraft is depicted in accordance with an illustrative embodiment. Autonomous distress tracking system 200 attached to aircraft 202 is an example of one implementation of autonomous distress tracking system 122 attached to aircraft 102 in FIG. 1. For example, without limitation, autonomous distress tracking system 200 may be attached to aircraft 202 on outside 204 of aircraft 202.

Autonomous distress tracking system 200 comprises various electronics elements contained within housing 206. Housing 206 may be made in any appropriate manner of any appropriate material such that the electronics contained inside housing 206 are protected to maintain proper operation of autonomous distress tracking system 200 when autonomous distress tracking system 200 is attached to aircraft 202 on outside 204 of aircraft 202.

Housing 206 may have any appropriate shape. For example, housing 206 may have an appropriately aerodynamic shape. For example, without limitation, housing 206 may have a shape similar to a blade antenna for an emergency locator transmitter on an aircraft.

Electronics elements for autonomous distress tracking system 200 may include system controller 208, satellite navigation system receiver 210, ADS-B transceiver 212, beacon transmitter 214, antennas 216, battery 218, and power manager 220.

System controller 208 may be implemented using an appropriate processor or in any other appropriate manner.

System controller 208 may be configured to control overall operation of autonomous distress tracking system 200 as described herein. For example, system controller 208 may be configured to report status 222 of autonomous distress tracking system 200 to alerting system 224 on inside 226 of aircraft 202. For example, alerting system 224 may be an engine-indicating and crew-alerting system, EICAS. In this case, system controller 208 may report current status 222 of autonomous distress tracking system on a continuous basis on a 429 bus on aircraft 202 so that appropriate EICAS messages or maintenance computer actions can be supported.

Distress identifier 228 may be implemented as part of or separate from system controller 208. Distress identifier 228 is configured to determine when aircraft 202 is in distress condition 230. Distress identifier 228 includes appropriate internal logic processing capabilities to determine when aircraft 202 is in distress condition 230 using information from various sources as described herein. System controller 208 is configured to cause autonomous distress tracking system 200 to transmit distress transmission 232 automatically in response to a determination by distress identifier 228 that aircraft 202 is in distress condition 230.

Satellite navigation system receiver 210 may be configured to receive navigation signals from satellites in a satellite navigation system. For example, without limitation, satellite navigation system receiver 210 may be configured to receive navigation signals from satellites in a global navigation satellite system such as the Global Positioning System (GPS), the Global Navigation Satellite System (GLONASS), another appropriate satellite navigation system, or from various combinations of satellite navigation systems. In accordance with an illustrative embodiment, the navigation signals received by satellite navigation system receiver 210 may be used to determine position 234 of aircraft 202. Position 234 of aircraft 202 preferably may be a three-dimensional position of aircraft 202.

Position 234 of aircraft 202 also may be determined by satellite navigation receiver for aircraft navigation 211 located inside 226 of aircraft 202. Satellite navigation receiver for aircraft navigation 211 may determine position 234 of aircraft 202 in the same manner as satellite navigation system receiver 210 in autonomous distress tracking system 200.

ADS-B transceiver 212 is configured to transmit automatic distress transmission 236. Automatic distress transmission 236 is part of distress transmission 232 that is transmitted by autonomous distress tracking system 200 automatically in response to a determination that aircraft 202 is in distress condition 230. Automatic distress transmission 236 may include identification information 238 that identifies aircraft 202, position information 240 that identifies position 234 of aircraft 202 as determined by satellite navigation system receiver 210, and distress status information 242 that identifies the cause of distress condition 230 for aircraft 202. Automatic distress transmission 236 may be transmitted at any appropriate rate 244. For example, without limitation, rate 244 may be approximately one transmission per second.

ADS-B transceiver 212 also may be configured to receive ADS-B transmission 246 and emergency mode code 248 which may be transmitted from air traffic control transponder 250 located inside 226 of aircraft 202. As will be discussed in more detail below, ADS-B transmission 246 and emergency mode code 248 may be monitored and used by distress identifier 228 to determine whether aircraft 202 is in distress condition 230.

Beacon transmitter 214 is configured to transmit emergency locator transmitter beacon 252 as part of distress transmission 232 when aircraft 202 is determined to be in distress condition 230. Emergency locator transmitter beacon 252 may be transmitted at 121 MHz, at 406 MHz, or at both 121 MHz and 406 MHz. As discussed herein, for example, with reference to FIG. 4, autonomous distress tracking system 200 in accordance with an illustrative embodiment may replace a conventional emergency locator transmitter on aircraft 202. Beacon transmitter 214 allows autonomous distress tracking system 200 to transmit emergency locator transmitter beacon 252 in place of the transmission from such a conventional emergency locator transmitter. Emergency locator transmitter beacon 252 transmitted from autonomous distress tracking system 200 may be received and handled in the same manner as a transmission from a conventional emergency locator transmitter.

Antennas 216 comprise any appropriate antennas for receiving or transmitting signals by satellite navigation system receiver 210, ADS-B transceiver 212, and beacon transmitter 214. Antennas 216 may include other antennas for other communications systems in autonomous distress tracking system 200. Antennas 216 may be contained within housing 206. Alternatively, or in addition, antennas 216 or appropriate portions of antennas 216 may be on an outside surface of housing 206, with appropriate connections to the electronics within housing 206.

Battery 218 comprises any appropriate number of rechargeable batteries. Power manager 220 is configured to control the providing of power to the electronic components of autonomous distress tracking system 200. For example, when power is available from power source 258 located inside 226 of aircraft 202, power manager 220 provides power to the electronic components of autonomous distress tracking system 200 from power source 258 and uses power from power source 258 to keep battery 218 in a charged state. When power is not available from power source 258, power manager 220 provides power to the electronic components of autonomous distress tracking system 200 from battery 218.

The different components illustrated for autonomous distress tracking system 200 are not meant to provide architectural limitations to the manner in which different embodiments may be implemented. The different illustrative embodiments may be implemented in a system including components in addition to or in place of those illustrated autonomous distress tracking system 200. Other components shown in FIG. 2 can be varied from the illustrative examples shown.

Figure 3:
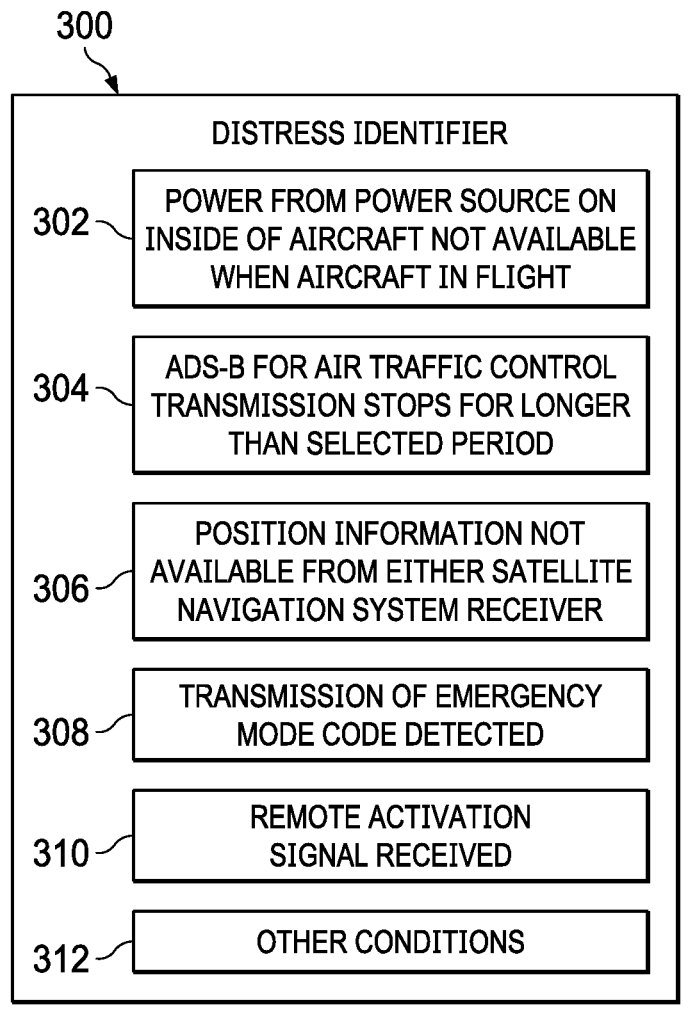
FIG. 3 is an illustration of a block diagram of a distress identifier in accordance with an illustrative embodiment.

Turning to FIG. 3, an illustration of a block diagram of a distress identifier is depicted in accordance with an illustrative embodiment. Distress identifier 300 is an example of one implementation of distress identifier 228 in FIG. 2.

Distress identifier 300 is configured to determine when an aircraft is in a distress condition. For example, distress identifier 300 may be configured to determine that an aircraft is in a distress condition when power from a power source on the inside of the aircraft is not available while the aircraft is in flight 302. Distress identifier 300 may be configured to determine that an aircraft is in a distress condition when an ADS-B for air traffic control transmission from the aircraft stops for longer than a selected period 304. Distress identifier 300 may be configured to determine that an aircraft is in a distress condition when position information for the aircraft is not available from either a satellite navigation system receiver in the autonomous distress tracking system or inside of the aircraft 306. Distress identifier 300 may be configured to determine that an aircraft is in a distress condition when transmission of an emergency mode code is detected 308. Distress identifier 300 may be configured to determine that an aircraft is in a distress condition when a remote activation signal is received 310. Alternatively, or in addition, distress identifier 300 may be configured to determine that an aircraft is in a distress condition when other conditions 312 are determined to exist.

Figure 4:
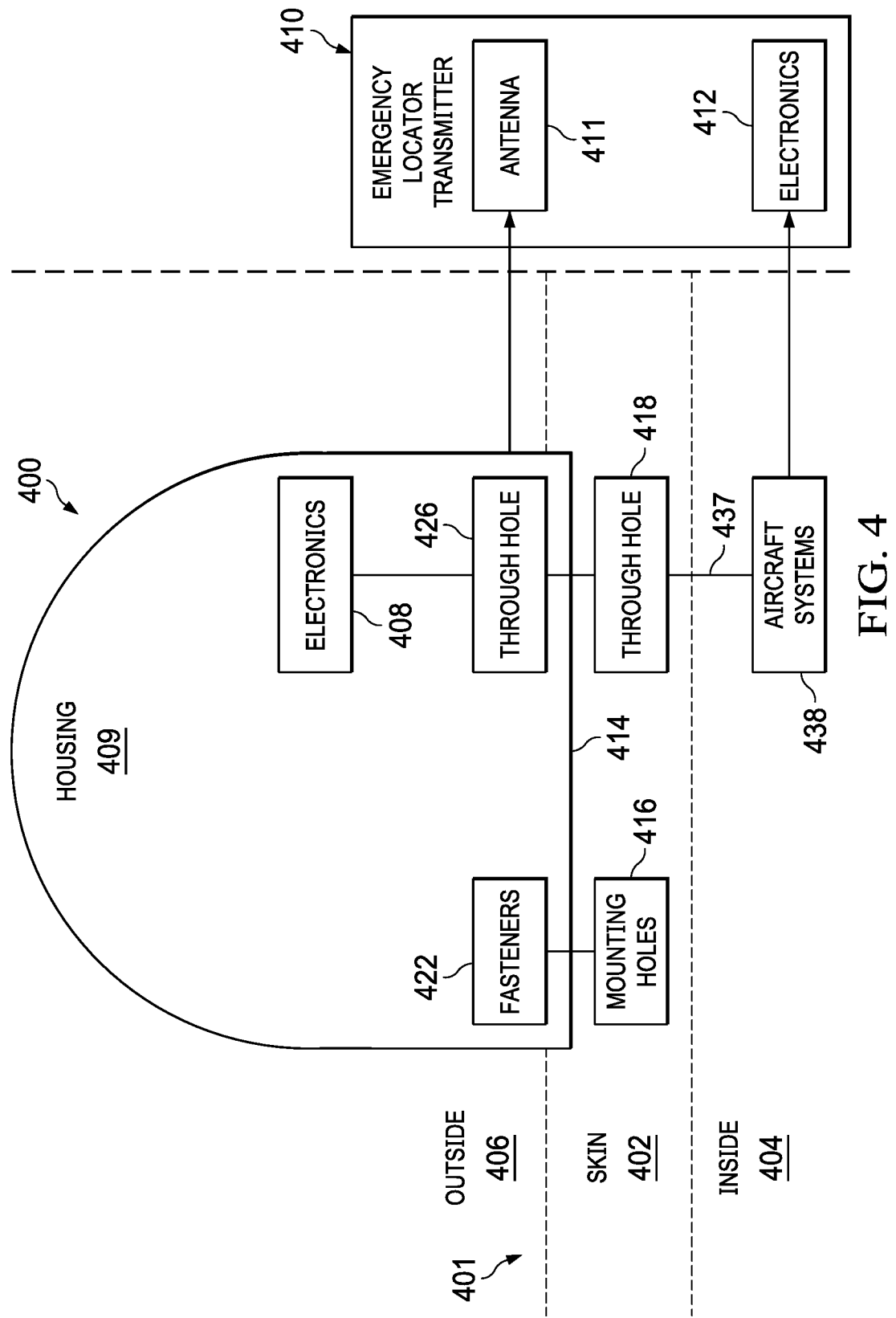
FIG. 4 is an illustration of a block diagram of an autonomous distress tracking system attached to an aircraft to replace an emergency locator transmitter on the aircraft in accordance with an illustrative embodiment.

Turning to FIG. 4, an illustration of a block diagram of an autonomous distress tracking system attached to an aircraft to replace an emergency locator transmitter on the aircraft is depicted in accordance with an illustrative embodiment. Autonomous distress tracking system 400 on aircraft 401 may be an example of one implementation of autonomous distress tracking system 122 on aircraft 102 in FIG. 1 or of autonomous distress tracking system 200 on aircraft 202 in FIG. 2.

Autonomous distress tracking system 400 is attached to skin 402 of aircraft 401 on outside 406 of aircraft 401. Skin 402 comprises any appropriate structure that separates outside 406 of aircraft 401 from inside 404 of aircraft 401.

Autonomous distress tracking system 400 comprises electronics 408 contained within housing 409. The functionality provided by autonomous distress tracking system 400 may replace and improve upon the functionality provided by emergency locator transmitter 410 on aircraft 401. For example, without limitation, emergency locator transmitter 410 may be removed from aircraft 401 before autonomous distress tracking system 400 is attached to aircraft 401. Removing emergency locator transmitter 410 from aircraft 401 may include removing antenna 411 for emergency locator transmitter 410 from skin 402 of aircraft 401 on outside 406 of aircraft 401 and removing electronics 412 for emergency locator transmitter 410 from inside 404 of aircraft 401.

Footprint 414 of antenna 411 is the area on skin 402 of aircraft 401 from which antenna 411 for emergency locator transmitter 410 was removed. Footprint 414 may include various structures for positioning antenna 411 for emergency locator transmitter 410 on skin 402 of aircraft 401, for attaching antenna 411 for emergency locator transmitter 410 to skin 402 of aircraft 401, or for other appropriate purposes or various combinations of purposes. For example, without limitation, footprint 414 may include mounting holes 416 and through hole 418. Mounting holes 416 may include any appropriate number of holes in skin 402 of aircraft 401 within footprint 414. Mounting holes 416 may have been used to attach antenna 411 for emergency locator transmitter 410 to skin 402 of aircraft 401. Through hole 418 may comprise a hole extending from inside 404 of aircraft 401 to outside 406 of aircraft 401 through skin 402 of aircraft 401 within footprint 414. Through hole 418 may have been used for extending wiring through skin 402 of aircraft 401 to connect antenna 411 for emergency locator transmitter 410 to electronics 412 for emergency locator transmitter 410.

Autonomous distress tracking system 400 may be attached to skin 402 of aircraft 401 in footprint 414, at the location on skin 402 of aircraft 401 from where antenna 411 for emergency locator transmitter 410 was removed. Autonomous distress tracking system 400 may be attached to skin 402 of aircraft 401 using appropriate fasteners 422. For example, without limitation, fasteners 422 may extend from housing 409 of autonomous distress tracking system 400 into mounting holes 416 in skin 402 of aircraft 401 to attach housing 409 to skin 402 of aircraft 401. Fasteners 422 may include any appropriate structures for attaching housing 409 to skin 402 of aircraft 401. For example, without limitation, fasteners 422 may include screws, bolts, clips, rivets, an adhesive, any other appropriate fastening structure or material, or various combinations of appropriate fasteners.

Line 437 may be extended from electronics 408 in housing 409 attached to skin 402 of aircraft 401 on outside 406 of aircraft 401 to aircraft systems 438 inside 404 of aircraft 401. For example, line 437 may be extended through hole 426 in housing 409 and through hole 418 in skin 402 of aircraft 401 to connect aircraft systems 438 to electronics 408.

Figure 5:
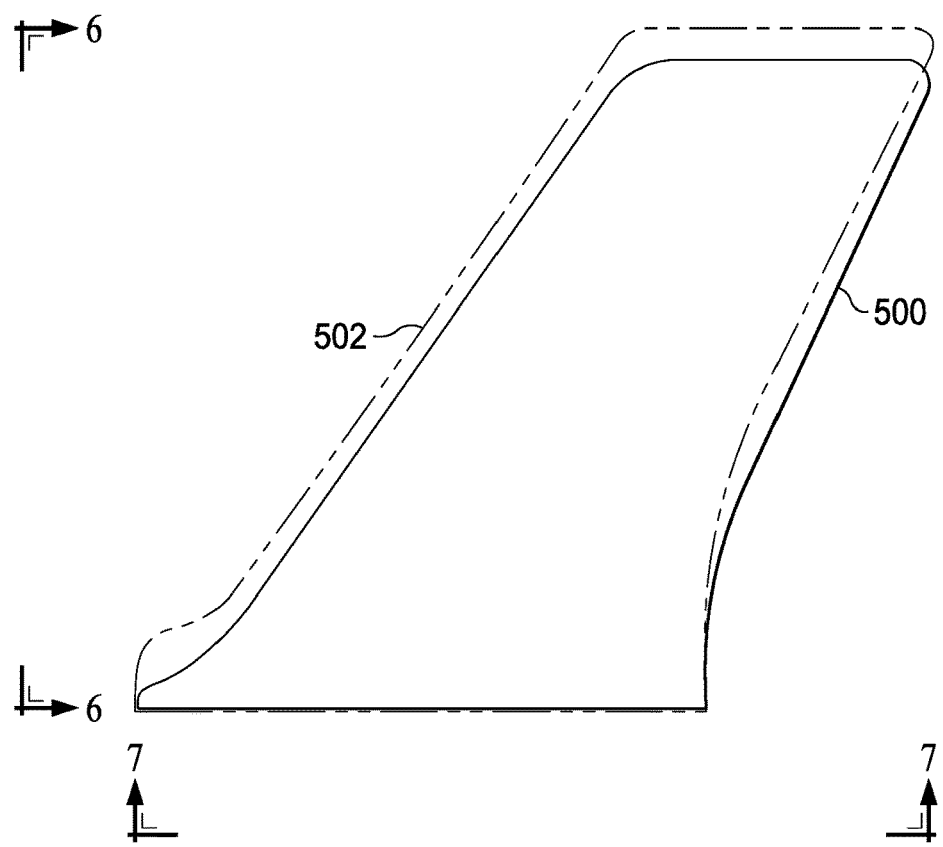
FIG. 5 is an illustration of a side view of an emergency locator transmitter antenna and a housing for an autonomous distress tracking system in accordance with an illustrative embodiment.
Figure 6:
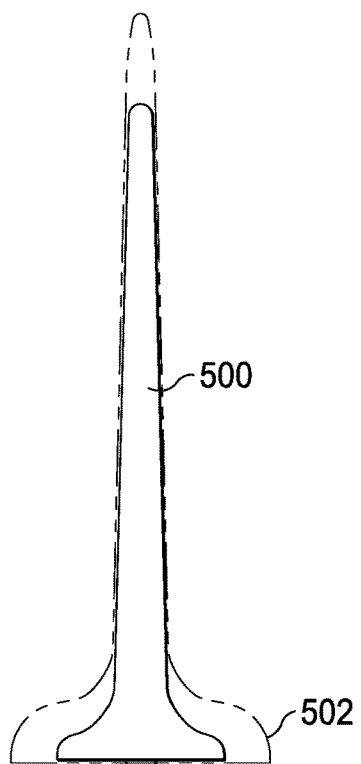
FIG. 6 is an illustration of a front view of the emergency locator transmitter antenna and the housing for the autonomous distress tracking system in accordance with the illustrative embodiment of FIG. 5 as taken along line 6-6 of FIG. 5.
Figure 7:
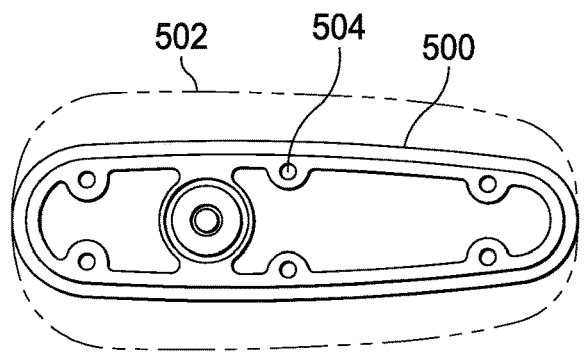
FIG. 7 is an illustration of a bottom view of the emergency locator transmitter antenna and the housing for the autonomous distress tracking system in accordance with the illustrative embodiment of FIG. 5 as taken along line 7-7 of FIG. 5.

Turning to FIGS. 5-7, FIG. 5 is an illustration of a side view of an emergency locator transmitter antenna and a housing for an autonomous distress tracking system in accordance with an illustrative embodiment, FIG. 6 is an illustration of a front view of the emergency locator transmitter antenna and the housing for the autonomous distress tracking system in accordance with the illustrative embodiment of FIG. 5 as taken along line 6-6 of FIG. 5, and FIG. 7 is an illustration of a bottom view of the emergency locator transmitter antenna and the housing for the autonomous distress tracking system in accordance with the illustrative embodiment of FIG. 5 as taken along line 7-7 of FIG. 5.

Emergency locator transmitter antenna 500 is shown in solid lines in FIGS. 5-7. Housing 502 for an autonomous distress tracking system in accordance with an illustrative embodiment is shown in the dashed line in FIGS. 5-7. Note that housing 502 may have a similar general shape as emergency locator transmitter antenna 500 that housing 502 may replace on an aircraft. Housing 502 may be somewhat larger than antenna 500 that it is replacing, in order to accommodate the components of an autonomous distress tracking system in housing 502. However, various mounting structures 504 on antenna 500 for attaching antenna 500 to an aircraft preferably are the same on housing 502, so that housing 502 may be easily mounted to the location on the aircraft from which antenna 500 was removed with minimal or no modification of the aircraft.

Figure 9:
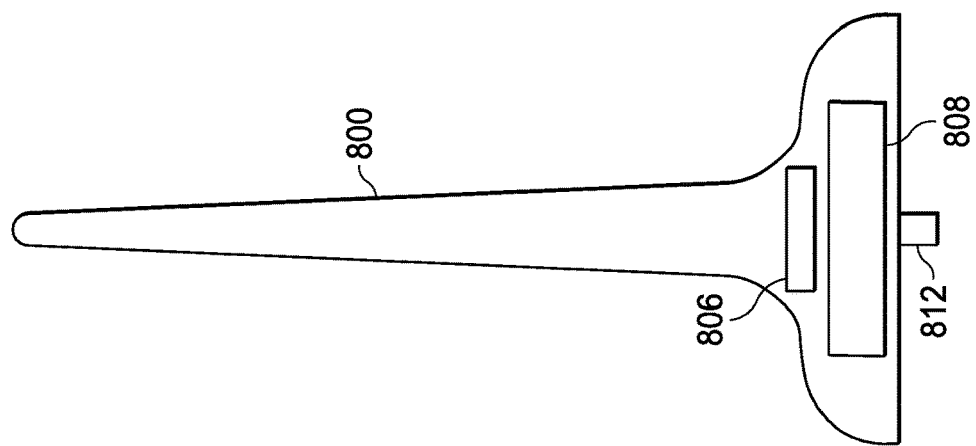
FIG. 9 is an illustration of a front view of the notional arrangement of components in the housing for the embodiment of the autonomous distress tracking system in accordance with the illustrative embodiment of FIG. 8 as taken along line 9-9 of FIG. 8.
Figure 8:
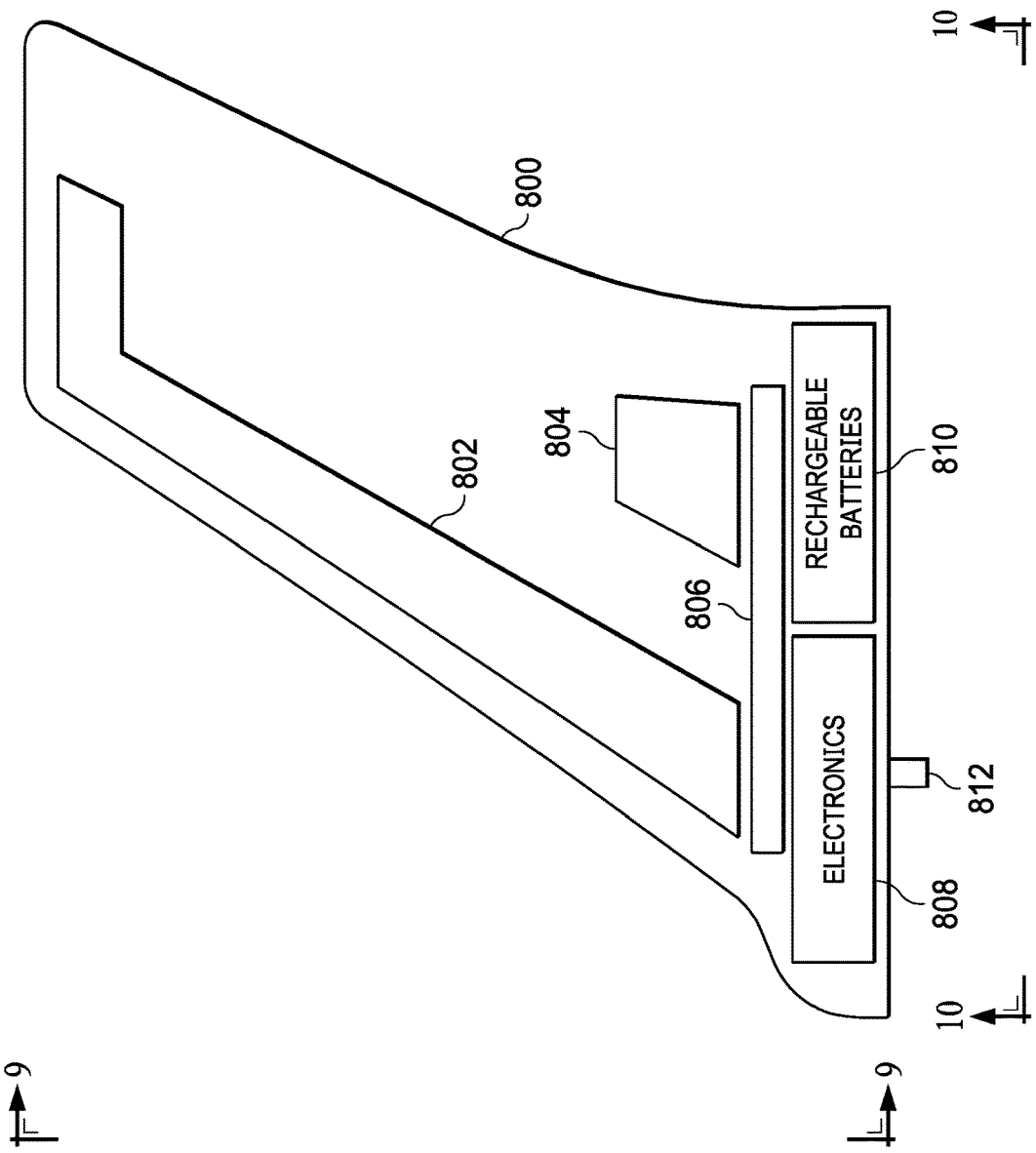
FIG. 8 is an illustration of a side view of a notional arrangement of components in a housing for an embodiment of an autonomous distress tracking system in accordance with an illustrative embodiment.
Figure 10:
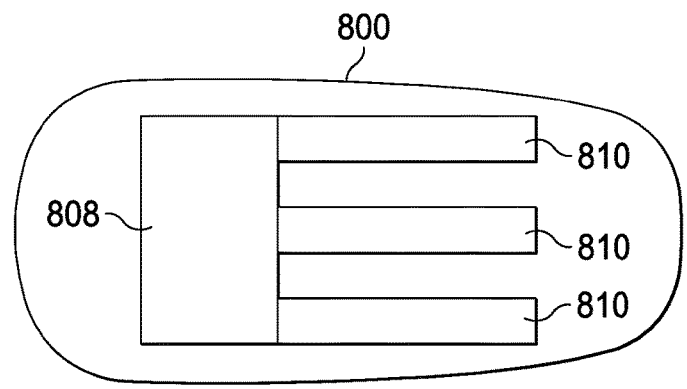
FIG. 10 is an illustration of a bottom view of the notional arrangement of components in the housing for the embodiment of the emergency locator transmitter in accordance with the illustrative embodiment of FIG. 8 as taken along line 10-10 of FIG. 8.

Turning now to FIGS. 8-10, FIG. 8 is an illustration of a side view of a notional arrangement of components in a housing for an embodiment of an autonomous distress tracking system in accordance with an illustrative embodiment, FIG. 9 is an illustration of a front view of the notional arrangement of components in the housing for the embodiment of the autonomous distress tracking system in accordance with the illustrative embodiment of FIG. 8 as taken along line 9-9 of FIG. 8, and FIG. 10 is an illustration of a bottom view of the notional arrangement of components in the housing for the embodiment of the emergency locator transmitter in accordance with the illustrative embodiment of FIG. 8 as taken along line 10-10 of FIG. 8.

FIGS. 8-10 show one possible arrangement of components of an autonomous distress tracking system in accordance with an illustrative embodiment in housing 800 having the shape of a blade antenna. Illustrated components include 121 MHz antenna 802 for a beacon transmission, 1090 MHz antenna 804 for an ADS-B transceiver, patch antenna 806 for a satellite navigation system receiver, electronics 808 for the autonomous distress tracking system, and rechargeable batteries 810. A connector 812 may be provided for connecting electronics 808 to aircraft systems on the inside of an aircraft when housing 800 is attached to the aircraft on an outside of the aircraft.

Figure 11:
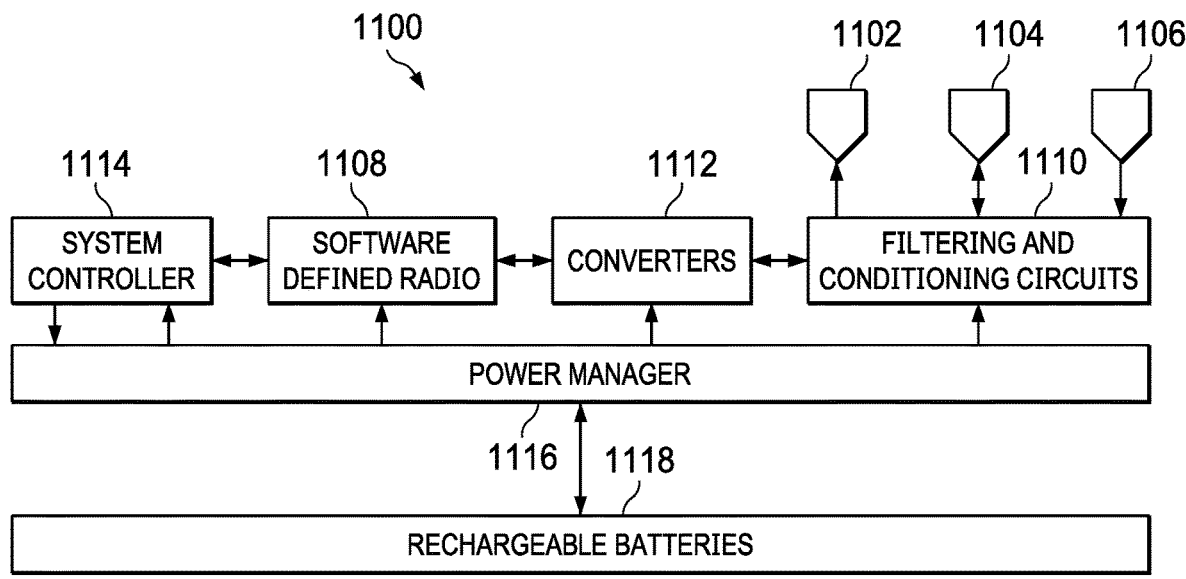
FIG. 11 is functional block diagram of an embodiment of an autonomous distress tracking system in accordance with an illustrative embodiment.

Turning to FIG. 11, a functional block diagram of an embodiment of an autonomous distress tracking system is depicted in accordance with an illustrative embodiment.

Autonomous distress tracking system 1100 may be an example of the autonomous distress tracking system in housing 800 in FIGS. 8-10.

Autonomous distress tracking system 1100 includes antenna 1102 for beacon transmissions, antenna 1104 for an ADS-B transceiver, and antenna 1106 for a satellite navigation system receiver. In accordance with this illustrative embodiment, the beacon transmitter, ADS-B transceiver, and satellite navigation receiver may be implemented in software defined radio 1108. Appropriate filtering and conditioning circuits 1110 and digital-to-analog and analog-to-digital converters 1112 may be provided between antennas 1102, 1104, and 1106 and software defined radio 1108.

System controller 1114 provides general control of the operation of autonomous distress tracking system 1100. Power manager 1116 controls the providing of power to the other electronic components of the system including charging of rechargeable batteries 1118.

Figures 12, 13:
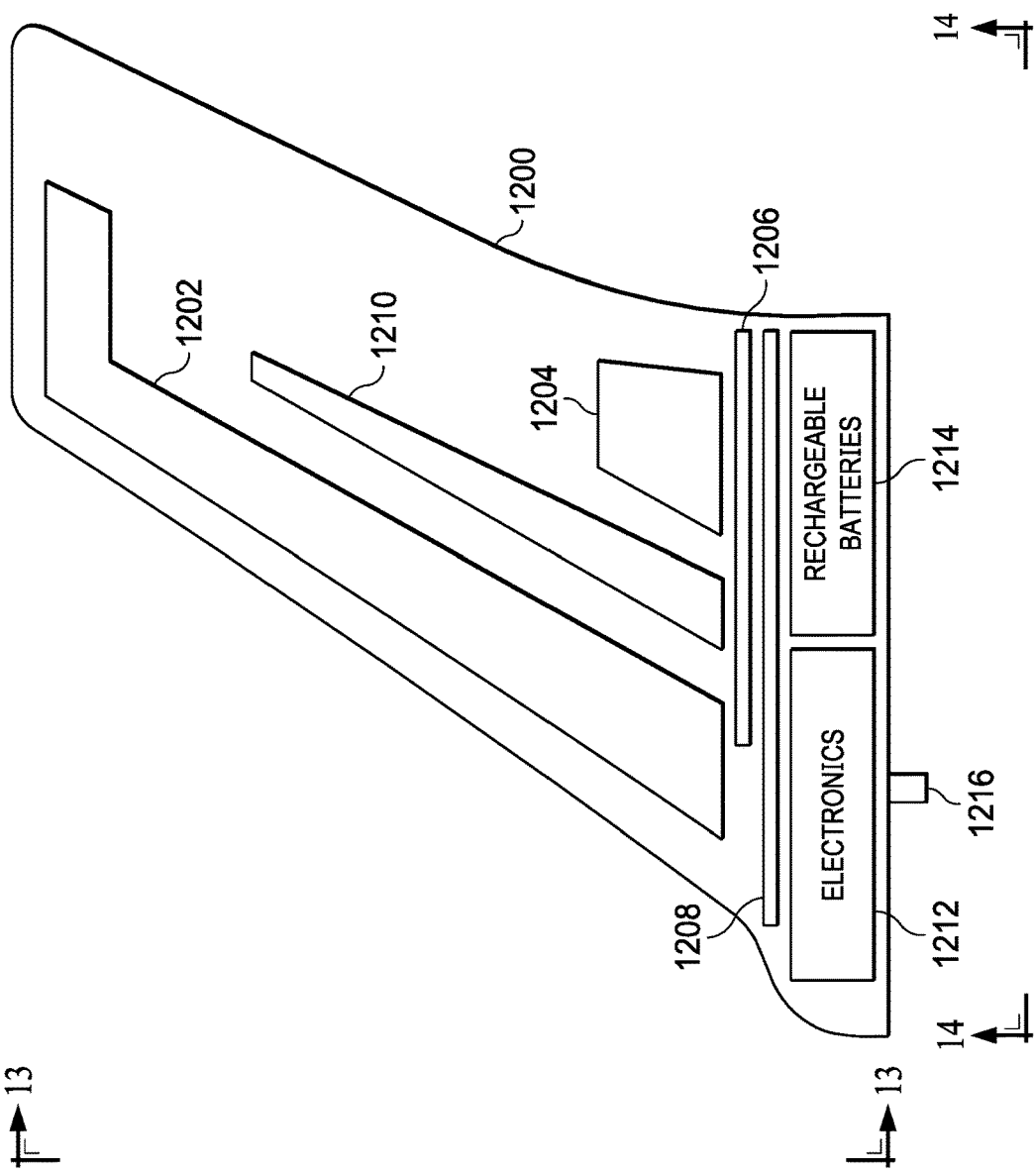
FIG. 12 is an illustration of a side view of a notional arrangement of components in a housing for another embodiment of an autonomous distress tracking system in accordance with an illustrative embodiment.
FIG. 13 is an illustration of a front view of the notional arrangement of components in the housing for the embodiment of the autonomous distress tracking system in accordance with the illustrative embodiment of FIG. 12 as taken along line 13-13 of FIG. 12.
Figure 14:
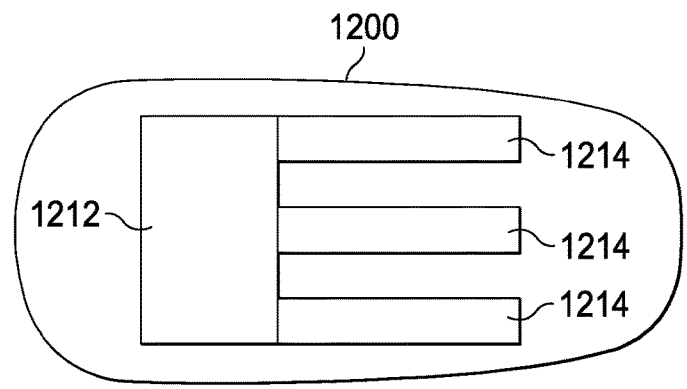
FIG. 14 is an illustration of a bottom view of the notional arrangement of components in the housing for the embodiment of the emergency locator transmitter in accordance with the illustrative embodiment of FIG. 12 as taken along line 14-14 of FIG. 12.

Turning to FIGS. 12-14, FIG. 12 is an illustration of a side view of a notional arrangement of components in a housing for another embodiment of an autonomous distress tracking system in accordance with an illustrative embodiment, FIG. 13 is an illustration of a front view of the notional arrangement of components in the housing for the embodiment of the autonomous distress tracking system in accordance with the illustrative embodiment of FIG. 12 as taken along line 13-13 of FIG. 12, and FIG. 14 is an illustration of a bottom view of the notional arrangement of components in the housing for the embodiment of the emergency locator transmitter in accordance with the illustrative embodiment of FIG. 12 as taken along line 14-14 of FIG. 12.

FIGS. 12-14 show another possible arrangement of components of an autonomous distress tracking system in accordance with an illustrative embodiment in housing 1200 having the shape of a blade antenna. Illustrated components include 121 MHz antenna 1202 for a beacon transmission, 1090 MHz antenna 1204 for an ADS-B transceiver, patch antenna 1206 for a satellite navigation system receiver, patch antenna 1208 for satellite communications, antenna 1210 for connecting to a wireless network, electronics 1212 for the autonomous distress tracking system, and rechargeable batteries 1214. Connector 1216 may be provided for connecting electronics 1212 to aircraft systems on the inside of an aircraft when housing 1200 is attached to the aircraft on an outside of the aircraft.

Figure 15:
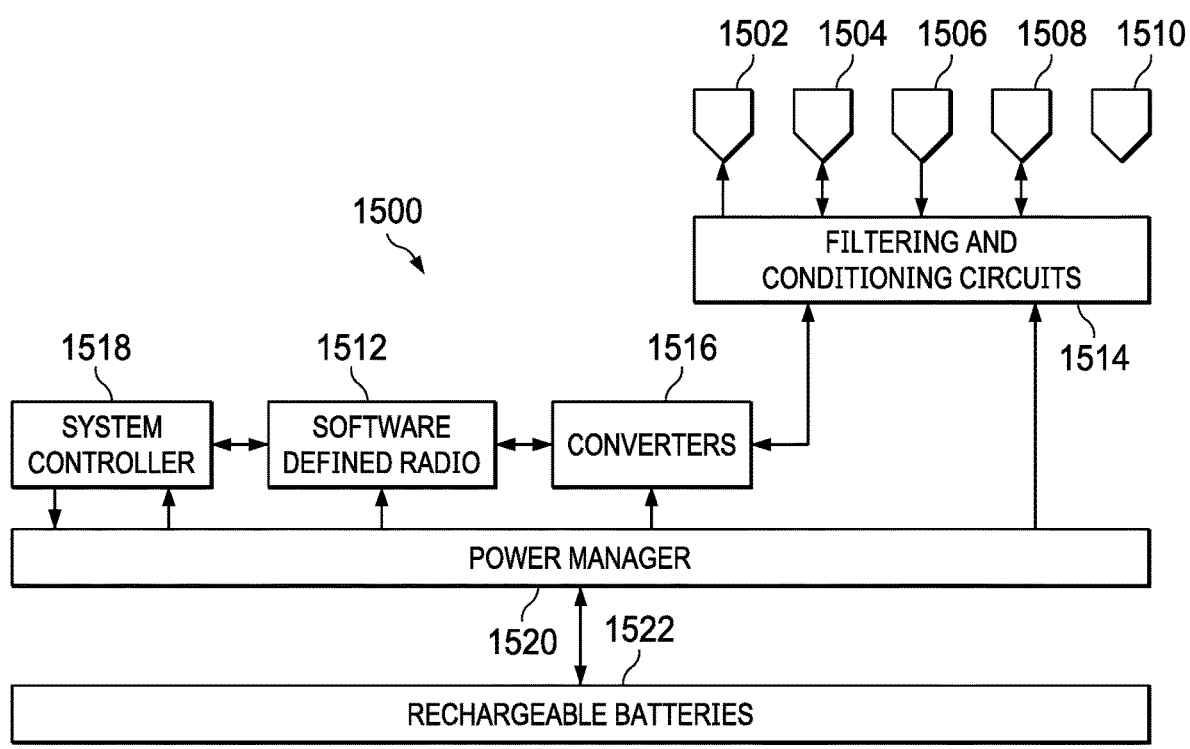
FIG. 15 is functional block diagram of an embodiment of an autonomous distress tracking system in accordance with another illustrative embodiment.

Turning to FIG. 15, a functional block diagram of an embodiment of an autonomous distress tracking system is depicted in accordance with another illustrative embodiment. Autonomous distress tracking system 1500 may be an example of the autonomous distress tracking system in housing 1200 in FIGS. 12-14.

Autonomous distress tracking system 1500 includes antenna 1502 for beacon transmissions, antenna 1504 for an ADS-B transceiver, antenna 1506 for a satellite navigation system receiver, antenna 1508 for satellite communications, and antenna 1510 for connectivity to a wireless network. For example, antenna 1510 may provide access to a wireless network such as a Wi-Fi network, a cellular telephone network, or a personal area network. Antenna 1508 for satellite communications may be an antenna for L-band satellite communications.

In accordance with this illustrative embodiment communications via the various communications channels provide by antennas 1502, 1504, 1506, 1508, and 1510 may be implemented in software defined radio 1512. Appropriate filtering and conditioning circuits 1514 and digital-to-analog and analog-to-digital converters 1516 may be provided between antennas 1502, 1504, 1506, 1508, and 1510 and software defined radio 1512.

System controller 1518 provides general control of the operation of autonomous distress tracking system 1500. Power manager 1520 controls the providing of power to the other electronic components of the system including charging of rechargeable batteries 1522.

Autonomous distress tracking system 1500 is an example of a multi-service integrated autonomous distress tracking system in accordance with an illustrative embodiment. Autonomous distress tracking system 1500 may be configured in the field to support a variety of communications links to support the service offering or the distress tracking operational approach that a particular airline or other aircraft operator wants to utilize. For example an airline could opt to use COSPAS SARSAT services only as with a conventional emergency locator transmitter, or use an Iridium or Inmarsat SATCOM based distress tracking service with ground based validation or pursue a hybrid or combined service for example using SATCOM based distress tracking services for potential distress conditions and adding COSPAS-SARSAT distress transmissions in the case of escalation to a validated distress event. The multi-service service approach may also be used to provide channels for remote ground activation of the distress tracker—for example when an aircraft has missed a scheduled position reporting time.

Figure 16:
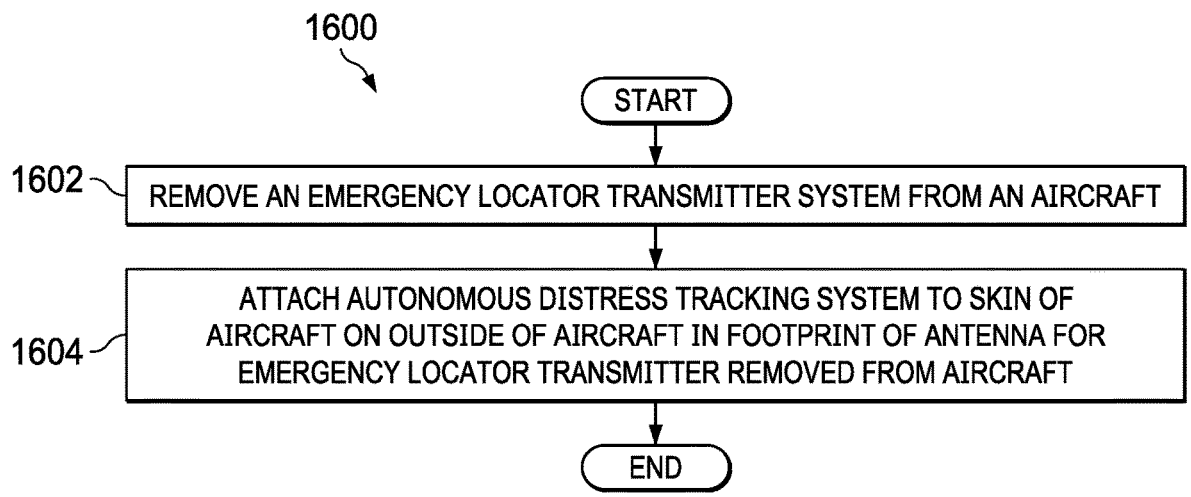
FIG. 16 is an illustration of a flowchart of a process for attaching an autonomous distress tracking system to an aircraft in accordance with an illustrative embodiment.

Turning to FIG. 16, an illustration of a flowchart of a process for attaching an autonomous distress tracking system to an aircraft is depicted in accordance with an illustrative embodiment. Process 1600 may be an example of one implementation of a process for attaching autonomous distress tracking system 400 to aircraft 401 in FIG. 4.

Process 1600 may begin by removing an emergency locator transmitter from an aircraft (operation 1602). Operation 1602 may include removing an antenna for the emergency locator transmitter from where the antenna was attached to a skin of the aircraft on an outside of the aircraft.

An emergency locator transmitter in accordance with an illustrative embodiment then may be attached to the skin of the aircraft on the outside of the aircraft in the footprint of the antenna for the emergency locator transmitter that was removed from the aircraft (operation 1604), with the process terminating thereafter.

Figure 17:
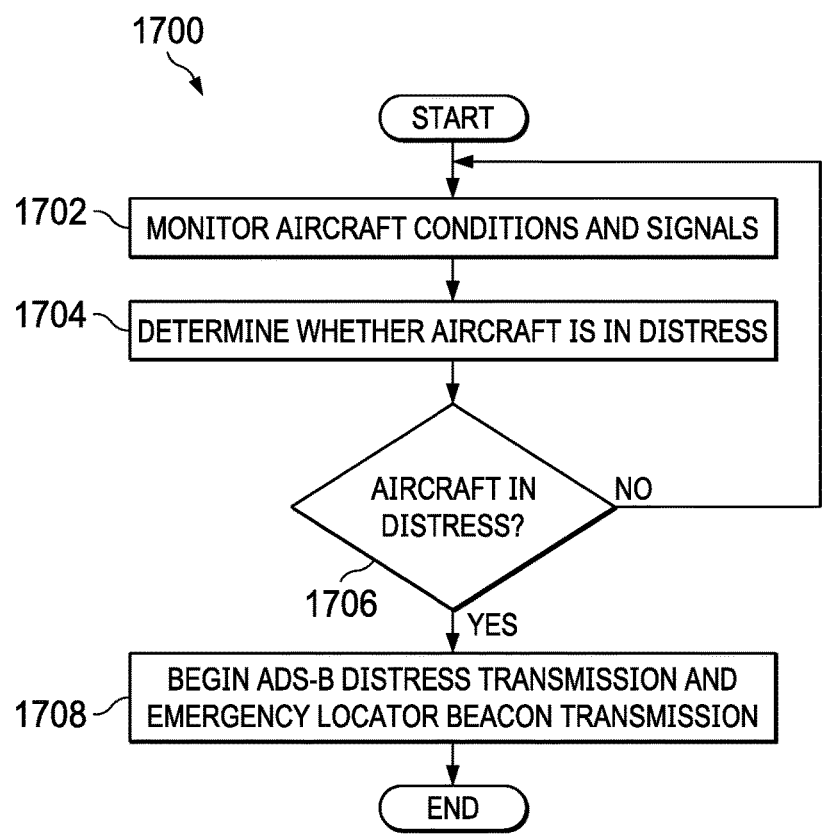
FIG. 17 is an illustration of a flowchart of a process for operation of an autonomous distress tracking system in accordance with an illustrative embodiment.

Turning to FIG. 17, an illustration of a flowchart of a process for operation of an autonomous distress tracking system is depicted in accordance with an illustrative embodiment. Process 1700 may be implemented, for example, in autonomous distress tracking system 200 in FIG. 2.

Process 1700 may begin with monitoring various aircraft conditions and signals (operation 1702). The monitored conditions and signals are used to determine whether the aircraft is in distress (operation 1704). In response to a determination at operation 1706 that the aircraft is in distress, an ADS-B distress transmission and emergency locator beacon transmission may be started (operation 1708), with the process terminating thereafter. In response to a determination at operation 1706 that the aircraft is not in distress, process 1700 may continue to monitor aircraft conditions and signals to determine whether the aircraft is in distress by returning to operation 1702.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An autonomous distress tracking system for an aircraft, comprising:
   an automatic dependent surveillance-broadcast transceiver configured to transmit an automatic distress transmission;
   a satellite navigation system receiver configured to identify a position of the aircraft using navigation signals received from a satellite navigation system and to provide position information indicating the position of the aircraft;
   an emergency locator transmitter beacon antenna for a beacon transmitter, a software defined radio that is configurable to implement at least the automatic dependent surveillance-broadcast transceiver and beacon transmitter and to transmit a distress transmission via one or more of an automatic dependent surveillance-broadcast antenna and the emergency locator transmitter beacon antenna;
   a system controller comprising a distress identifier configured to determine when the aircraft is in a distress condition and configured to control the automatic dependent surveillance-broadcast transceiver to transmit the automatic distress transmission in response to a determination that the aircraft is in the distress condition;
   and a housing attached to the aircraft on an outside of the aircraft, wherein the automatic dependent surveillance-broadcast transceiver, satellite navigation system receiver, software defined radio, and the system controller are contained within the housing.

2. The autonomous distress tracking system of claim 1 further comprising:
   a beacon transmitter contained within the housing and configured to transmit an emergency locator transmitter beacon;
   wherein the system controller is configured to control the beacon transmitter to transmit the emergency locator transmitter beacon in response to the determination that the aircraft is in the distress condition.

3. The autonomous distress tracking system of claim 1, wherein the automatic distress transmission comprises position information indicating a position of the aircraft and distress status information comprising information identifying a cause of the distress condition.

4. The autonomous distress tracking system of claim 1, wherein:
   the automatic dependent surveillance-broadcast transceiver is configured to receive an automatic dependent surveillance-broadcast transmission from the aircraft; and
   the distress identifier is configured to determine that the aircraft is in the distress condition in response to the automatic dependent surveillance-broadcast transmission from the aircraft stopping for longer than a selected time period.

5. The autonomous distress tracking system of claim 1, wherein:
   the automatic distress transmission comprises position information indicating a position of the aircraft;
   the system controller is configured to receive first position information indicating the position of the aircraft from a first satellite navigation system receiver contained within the housing and to use the first position information for the position information in the automatic distress transmission;
   the system controller is configured to receive second position information indicating the position of the aircraft from a second satellite navigation system receiver on the aircraft that is not contained within the housing and to use the second position information instead of the first position information for the position information in the automatic distress transmission when the first position information is not available from the first satellite navigation system receiver; and
   the distress identifier is configured to determine that the aircraft is in the distress condition in response to neither the first position information nor the second position information being available.

6. The autonomous distress tracking system of claim 1, wherein the distress identifier is configured to determine that the aircraft is in the distress condition in response to:
   detecting transmission of an emergency mode code from the aircraft; or
   receiving a remote activation signal from a location off of the aircraft to activate the automatic distress transmission.

7. The autonomous distress tracking system of claim 1 further comprising:
   a battery contained within the housing; and
   a power manager configured to:
      provide power to the automatic dependent surveillance-broadcast transceiver and the system controller and to charge the battery from a power source on an inside of the aircraft when the power is available from the power source on the inside of the aircraft; and
      provide the power to the automatic dependent surveillance-broadcast transceiver and the system controller from the battery when the power is not available from the power source on the inside of the aircraft; and
   wherein the distress identifier is configured to determine that the aircraft is in the distress condition in response to the power not being available from the power source on the inside of the aircraft when the aircraft is in flight.

8. The autonomous distress tracking system of claim 1, wherein the housing is attached to the outside of the aircraft at a location on the aircraft from which an antenna for an emergency locator transmitter was removed from the aircraft.

9. An autonomous distress tracking system for an aircraft, comprising:
   a satellite navigation system receiver configured to identify a position of the aircraft using navigation signals received from a satellite navigation system and to provide position information indicating the position of the aircraft;
   a plurality of antennas comprising a satellite navigation system antenna for receiving the navigation signals for the satellite navigation system receiver, an automatic dependent surveillance-broadcast antenna for an automatic dependent surveillance-broadcast transceiver, an emergency locator transmitter beacon antenna for a beacon transmitter, a satellite communications antenna for a satellite communications transceiver, and a wireless network antenna for connectivity to a wireless network by a wireless network transceiver;

a software defined radio that is configurable to implement the automatic dependent surveillance-broadcast transceiver, the beacon transmitter, the satellite communications transceiver, and the wireless network transceiver and to transmit a distress transmission via one or more of the automatic dependent surveillance-broadcast antenna, the emergency locator transmitter beacon antenna, the satellite communications antenna, and the wireless network antenna;

a system controller comprising a distress identifier configured to determine when the aircraft is in a distress condition and configured to control the software defined radio to transmit the distress transmission in response to a determination that the aircraft is in the distress condition; and a housing attached to the aircraft on an outside of the aircraft, wherein the satellite navigation system receiver, the software defined radio, and the system controller are contained within the housing.

10. The autonomous distress tracking system of claim 9, wherein the satellite navigation system receiver is implemented using the software defined radio.

11. The autonomous distress tracking system of claim 9, wherein the wireless network is selected from the group of wireless networks consisting of a Wi-Fi network, a cellular telephone network, and a personal area network.

12. A method of autonomous distress tracking of an aircraft, comprising:
transmitting an automatic distress transmission by an automatic dependent surveillance-broadcast transceiver;
identifying a position of the aircraft using navigation signals received from a satellite navigation system and to provide position information indicating the position of the aircraft by a satellite navigation system receiver;
implementing at least the automatic dependent surveillance-broadcast transceiver and beacon transmitter and transmitting a distress transmission via one or more of an automatic dependent surveillance-broadcast antenna and the emergency locator transmitter beacon antenna, by a software defined radio;
determining when the aircraft is in a distress condition and controlling the automatic dependent surveillance-broadcast transceiver to transmit the automatic distress transmission in response to a determination that the aircraft is in a distress condition;
and implementing autonomous distress tracking of an aircraft using a housing attached to the aircraft on an outside of the aircraft, wherein the automatic dependent surveillance-broadcast transceiver, satellite navigation system receiver, software defined radio, and a system controller are contained within the housing.

13. The method of claim 12, wherein the automatic distress transmission comprises position information identifying a position of the aircraft and distress status information identifying a cause of the distress condition.

14. The method of claim 12 further comprising:
transmitting, by a beacon transmitter, an emergency locator transmitter beacon in response to the determination by the distress identifier that the aircraft is in the distress condition.

15. The method of claim 12 further comprising:
receiving an automatic dependent surveillance-broadcast transmission from the aircraft; and
determining, by the distress identifier, that the aircraft is in the distress condition in response to the automatic dependent surveillance-broadcast transmission from the aircraft stopping for longer than a selected time period.

16. The method of claim 12, wherein determining that the aircraft is in the distress condition comprises:
detecting transmission of an emergency mode code from the aircraft; or
receiving a remote activation signal from a location off of the aircraft to activate the automatic distress transmission.

17. The method of claim 12, wherein the system controller and the automatic dependent surveillance-broadcast transceiver are contained within a housing attached to the aircraft on an outside of the aircraft.

18. The method of claim 17, wherein:
the automatic distress transmission comprises position information identifying a position of the aircraft;
the system controller receives first position information indicating the position of the aircraft from a first satellite navigation system receiver contained within the housing and uses the first position information for the position information in the automatic distress transmission;
the system controller receives second position information indicating the position of the aircraft from a second satellite navigation system receiver on the aircraft that is not contained within the housing; and
the distress identifier determines that the aircraft is in the distress condition in response to neither the first position information nor the second position information being available.

19. The method of claim 17 further comprising:
providing power to the system controller and the automatic dependent surveillance-broadcast transceiver from a power source on an inside of the aircraft when the power is available from the power source on the inside of the aircraft;
charging a battery contained within the housing from the power from the power source on the inside of the aircraft when the power is available from the power source on the inside of the aircraft;
providing power to the system controller and the automatic dependent surveillance-broadcast transceiver from the battery when the power is not available from the power source on the inside of the aircraft; and
determining, by the distress identifier, that the aircraft is in the distress condition in response to the power not being available from the power source on the inside of the aircraft when the aircraft is in flight.

20. The method of claim 17 further comprising:
removing an antenna for an emergency locator transmitter from a location on an outside of the aircraft where the antenna for the emergency locator transmitter is attached to the aircraft; and
attaching the housing to the outside of the aircraft at the location on the outside of the aircraft from which the antenna for the emergency locator transmitter was removed from the aircraft.

* * * * *